Patented Apr. 11, 1950

2,503,312

UNITED STATES PATENT OFFICE 2,503,312

SIMULTANEOUS DEFATTING AND DEHYDRATING OF FATTY SUBSTANCES

Everett M. Worsham, Monticello, and Ezra Levin, Champaign, Ill.; said Worsham assignor to said Levin No Drawing. Application December 29, 1945, Serial No. 638,446

21 Claims. (Cl. 99—208)

This invention relates to a process for defatting and dehydrating fatty substances, particularly those containing substantial amounts of water. More particularly, it relates to a method for removing water and fat from animal or plant tissues in a unitary process. Especially, it relates to treatment of tissue which is sensitive to heat particularly temperatures above about 100° C., in order to preserve valuable nutritive and therapeutic properties therein.

Many substances, particularly of an animal origin such as glandular tissue, meat, and the like, contain relatively high percentages of water which is present either in the form of intracellular fluid, or is present in the cell tissues, i. e. intracellular fluid. The removal of water from such tissues can be accomplished by evaporation either for a long period of time at a low temperature in dry atmosphere, or by heating them at a comparatively high temperature, for example above about 100° C. This operation is attended by the use of long periods of time and results in deep-seated changes in the tissue. Meat scrap, for example, is heated so that the residue is badly burned, producing "cracklings" of low food value and with many biological values completely destroyed. At temperatures above 100° C., certain components of many of these substances tend to coagulate and to bind the water even more tightly so that the drawing operation is time-consuming, costly, and destructive in so far as the tissue is concerned. Even the grinding of the tissue into the comparatively small particles does not eliminate this factor. The reduction of water to a point below approximately 5 or 10% is difficult and accompanied by serious changes in the components of the material undergoing treatment.

If substances containing enzymes, for example, pancreas, are heated for extended periods of time to dry them, the enzymes become activated and cause undesirable deep-seated biologic changes. Since these enzymes are valuable substances which it is desired to recover, and since there are other factors originally present which are valuable, it can be seen that irreparable damage results from such enzymatic action. Heretofore, the recovery of enzymes from such glands has been a costly and painstaking procedure. Pancreas, as sold commercially, contain about 70% of water, and of the remaining 30% of organic solids, 40% is fat. Consequently the pancreas has offered a difficult problem in drying, defatting, and separation of valuable constituents. Our invention solves these problems and makes possible the production of a dried, defatted substance which is readily treated in subsequent steps for recovery of valuable components. This dehydrating and defatting can be done without occurrence of deep-seated undesirable biologic changes. Consequently, not only is efficiency increased and the process simplified and the time of processing shortened, but values can be recovered far in excess of what was heretofore possible because (a) they are made more readily available and (b) they have not been destroyed because of biologic, oxidative, or thermal changes.

It is the common practice for example in treating fish to press the tissue under high pressures and usually at elevated temperatures, either before or after precooking and/or partial drying of the tissues. The pressing operation removes substantial amounts of fats and oils together with large amounts of water which is referred to as "press-water." The oil is skimmed from the surface of the water and may be refined separately. The water contains high percentages of water soluble materials including proteins, vitamins, hormones, etc. The residual meal still contains comparatively high percentages of water and substantial amounts of fats. It may be further dried before use in animal foods, as fertilizer, etc. The "press-water" represents a real problem and was formerly discarded, but is being condensed by evaporation in certain cases at the present time to recover some of the valuable constituents. It should be borne in mind that the physiological water within the cell tissues cannot be extracted by treatment with water and at least a substantial part of this which contains much of the valuable constituents in solution is lost during the pressing operation.

In certain instances, the tissues are partially dried and then passed through expellers at a comparatively high temperature before separating the oil from the water and then recover fish water solubles by evaporation. This operation destroys the nutrient value of the protein and also destroys many valuable constituents which are saved and made available according to our process.

In a broad embodiment the invention comprises heating wet organic tissue in the presence of a fat solvent at a temperature and pressure at which the solvent will distill, condensing the solvent and returning it to the system, and continuing the distillation and recirculation until the temperature of effluent vapor increases substantially, then separating the solvent containing oil from the defatted, dehydrated substance.

In one specific embodiment this invention comprises heating organic tissue in comminuted form to a temperature of approximately 60° C., either in the presence or absence of an added solvent so as to coagulate the albumen-like protein present, followed by treatment in the presence of an excess of solvent in which the solvent is distilled out of the substance, condensed, separated from the water which is carried over with the solvent and the solvent returned to the substance, continuing this treatment until a substantial rise in temperature of the vapors evolving from the system takes place and then withdrawing the liquid solvent and rinsing the residual material with one or more portions of solvent, to separate the fatty or oily constituents substantially completely.

The term "tissue" as used herein refers to raw or undehydrated cells or aggregates of cells together with their inter- and intra-cellular substance, and containing biological values naturally occurring therein substantially unimpaired.

The initial treatment is to sub-divide freshly killed tissue, for example, glandular tissue such as livers, pancreas, brains, kidneys, etc. Under some conditions, the materials may be passed between rolls in order to break up the cellular structure thereof to some extent. The mixture may then be heated with or without additional grinding to a temperature of about 60° C. This step may also be carried out at a somewhat higher temperature but should never exceed about 100° C. and preferably should be kept below 90° C. The treatment coagulates, at least in part, certain albumenous material contained in the substance undergoing treatment.

If desired, the heating step can be carried out in the presence of a solvent such as halogenated hydrocarbon, having a boiling point at the pressure employed, of below approximately 100° C. Of these ethylene dichloride and trichlorethylene are preferred. When the coagulating step is carried out in the presence of the solvent, the mixture may be stirred in order to keep the solid material in more or less separated form. If the heating step is carried out in the absence of the solvent, stirring may be resorted to to prevent particles from sticking together and to permit uncoagulated material to come in contact with the heating surfaces. In general this heating step is carried out in a comparatively short period of time preferably less than 10 hours and usually less than one or two hours. It is continued only so long as may be necessary to prevent the particles from forming clusters upon further heating or treatment. With some types of tissues it is not necessary to precoagulate, for example, if the particles do not tend to stick together. In any event the extent of coagulation is just sufficient to prevent sticking, after which the solvent distillation-extraction step is begun as soon as possible.

Treatment in an atmosphere comparatively free of oxygen is desirable since the presence of oxygen, particularly at the elevated temperatures, tends to initiate undesirable reactions. Thus an atmosphere of carbon dioxide, nitrogen, or some inert solvent may be used. If desired, the air can be replaced in the system before the coagulating step is conducted.

If the coagulating step is carried out in the presence of solvent, the amount of solvent is usually sufficient so that the solid material can be kept more or less suspended in the solvent although this is not essential and will depend to some extent upon the type of apparatus used. When using solvent in the coagulation step, one to five times as much solvent as tissue is usually used.

As soon as the material has coagulated sufficiently for the purpose intended, solvent is added, if there is none present or if the amount is too small for the next step. The temperature is increased to a point at which distillation of the solvent begins to occur. Ordinarily, the material is not fractionally distilled, but is merely distilled out of the system through a suitable conduit to a condenser wherein the vapors are cooled and condensed and then passed to a separator from which the solution is withdrawn and recirculated. A layer of water forms in the separator and is withdrawn and may be discarded. The use of solvents which are immiscible or substantially immiscible with water is necessary. In this way, little or no solvent is lost due to its solubility in the water withdrawn from the separator and discarded.

The condensed solvent is continuously returned to the apparatus containing the tissue as long as the temperature remains substantially constant. We have found that an unexpected happening occurs in that the water which is largely bound within the cellular structure of the tissue is distilled out of the substance along with the vapors of the solvent in spite of the fact that the temperature is far below the boiling point of water and in spite of the fact that the solvent and water are substantially immiscible. Thus we have found that water is removable from within the cell structure even though there is only one liquid layer within the still and the water is in combined form in the cells of the tissue. Nevertheless, the water is always removed from the tissue and distilled over with the solvent, being condensed with the solvent and, because of its immiscibility, separates therefrom. When using ethylene dichloride at atmospheric pressure, the tissue is dehydrated at a temperature of about 70° C.

During this step the solvent is continuously and effectively withdrawing or extracting the oils and fats from the tissue undergoing treatment. The oil remains dissolved in the liquid solvent contained in the still. The oily constituents are substantially completely soluble in the solvent due to the fact that in the contact of the hot solvent within the cell, the fat is drawn out through the cell walls into the solution. As the water moves out of the cellular tissue and is distilled, the extraction of the fat with the solvent becomes even more pronounced and effective. By the time the water has been removed, practically all of the fat has been "dissociated" from the tissue remaining so that it may be rapidly withdrawn in solution in the solvent. It is in such form that it becomes necessary only to rinse the solid material a time or two in order to completely remove all entrained or occluded oil from the residual meal. It is unnecessary to carry out several additional extraction steps or stages. More than 90% of the oil or fat is in the solvent draining from the meal when a 5:1 ratio of oil to tissue, e. g. liver, is used. The remainder of the oil is in solution in the solvent which is held up by the meal, and readily washes out upon rinsing of the meal. If desired, the final washings from the meal may be used to initially treat the next batch of material undergoing treatment. This saves solvent and it also saves in so far as heating costs and handling costs are concerned, particularly as to the recovery cost.

After draining off as much solvent used in the rinsing step as possible, the residual meal may be treated with closed steam at a temperature below 100° C. and preferably under vacuum, in order to remove absorbed solvent as completely as possible. This may be completed in the case of the halogenated solvent by the use of a short blast of steam in the final stages to remove the last remaining traces of solvent. This is accomplished in part by the hydrolysis of the solvent. This step is carried out under as greatly reduced sub-atmospheric pressure as is practical to use in order to keep the temperature as low as possible. The exact conditions will depend on the substance being defatted and upon what is desired of it in final form. No unusual or undesirable odors or flavors are imparted to the material undergoing treatment due to residual solvent. The reduced pressure and comparatively low temperature imparts stability to the meal and prevents destruction of valuable components.

The oil may be treated, preferably under vacuum, and in the presence of steam to remove the solvent therefrom. The composition of the oil will depend to a large extent upon the solvent used and the temperature employed. As a rule it contains practically all the oil-soluble vitamins as well as many other factors including therapeutic factors such as oil soluble hormones. The oil has the property of being highly stable when stored over long periods of time.

The defatted meals thus produced are also stable and do not disintegrate, hydrolyze, or oxidize upon standing.

*Example 1.*—Fresh hog liver which is normally used only in animal foods because it is considered unfit for human consumption, can be ground into fine particles by an ordinary meat grinder and this may be treated in one of two ways. It is heated on a heating surface such as a skillet or grill at a temperature of about 60° C. to partially coagulate it. The temperature may be allowed to go somewhat higher but it should be as low as possible and still accomplish the result of coagulating the albumen-like protein present. It should not be heated above 90–100° C. The coagulated material may then be treated with a solvent such as ethylene dichloride with or without stirring. A substantial amount of ethylene dichloride is used, preferably two to five times the ground liver by weight.

The coagulated mixture is then heated to a point at which the solvent distills off. The mixture, when distilled at atmospheric pressure, boils constantly at about 71° C. until the water is removed substantially completely, after which there is a rapid upturn in the temperature until the vapor coming from the still is substantially pure ethylene dichloride. In order to maintain the amount of ethylene dichloride substantially constant within the still, the vapor is condensed, separated from water and the solvent is returned to the system, for example with a pump. It is understood that the dehydration can be stopped short of completion to leave any desired amount of water in the meal by stopping the distillation at a predetermined point.

After dehydration is completed the solvent is drained and filtered, if necessary, to remove any finely divided material. The defatted meal is rinsed, sometimes more than once. The rinsings may be added to the oil solution or may be used for treating the next batch of liver. The final wash employed will remove practically 100% of the fat. This rinsing step is essential to the efficiency of the process since some of the solvent-oil solution is absorbed or occluded on the meal and will not drain off. The solvent used in rinsing apparently extracts little or no oil from the tissue but merely washes out oil which has already been extracted from the cells during the distillation step. We have observed in the solvent extraction of animal tissue by most conventional means that solvent in successive stages seems to continue to remove oil from the tissue although at a reduced rate after the first washes. In other words, with the conventional type of treatment, not involving the initial distillation of the water and solvent from the substance, the oil is not completely dissolved in the solvent during the first extraction but continues to be extracted slowly and many times reluctantly from the tissue. The rapid and complete removal of fat from the tissue by our process is one of the great advantages that it possesses over the conventional type of treatment, aside from the fact that it permits unitary removal of water and fat. The temperature used is related to the solvent and the pressure under which the dehydration step is carried out. With ethylene dichloride for example, the temperature may be below 50° C. if vacuum is used.

The oil from the liver is heavy and viscous and tends to form a solid mass at temperatures very nearly atmospheric. The liver oil is recovered by distilling off the solvent under greatly reduced pressures of the order of 10–50 mm. pressure. As a final treatment while still under high vacuum a small amount of steam is passed through the substance to sweep it clean of solvent and to hydrolyze any solvent which tends to remain in the oil.

The meal is heated to about 40–70° C. under vacuum in order to remove most of the solvent which is preferably recovered. At the end of the treatment, a blast of steam is introduced to remove the last remaining portion of the solvent.

The oil contains the oil-soluble vitamins and certain oil-soluble hormones which are not recovered in any other way, at least to the extent that they are herein recovered. The meal contains water soluble hormones, vitamins, and other substances of similar character. This is an advantage for our process over one in which the tissue is pressed to remove oil and water, since our process retains these values unimpaired while they are lost, at least in part, otherwise. Liver meal by conventional production methods has an undesirable flavor and odor and contains no thiamin. Liver meal produced by our process is of pleasant flavor and has over one-half the theoretical thiamin values. The meal has a bland flavor reminiscent of chicken livers, but much milder. Most of the strong flavor has been removed. If desired the oil can be further refined.

The apparatus employed comprises a vessel or retort in which the tissue and solvent is placed, for example, on trays, screens or the like which may be heated. For example, a jacketed vessel may be used. The vessel may be provided with "open" and "closed" steam coils, internally. The vessel may be provided with agitators and may be rotatable. Suitable "gooseneck" connections may be provided to attach a distillation arm, conduit, or vapor line to a condenser and receiver. A separator in which the water and solvent may separate into two layers is provided. The solvent may be pumped back to the extraction vessel from the receiver. Provision may be made to add make-up solvent, and to rinse the cake after withdrawal of the solvent-oil layer. An outlet for withdrawing liquid is provided. Ports for dumping the meal and charging the vessel are provided. The system may be closed, once uncondensable gas has been driven off, so as to prevent loss of solvent.

*Example 2.*—Fish or fish refuse may be treated according to this process in the following manner: The whole fish, or the fish offal consisting principally of the internal organs, may be ground in any suitable manner. The mixture which has the consistency of a watery mush may be heated, preferably in the presence of a solvent, to a temperature of about 60° C. A distillation is carried out in the presence of a fat solvent which is immiscible with water, for example ethylene dichloride or some other comparatively low boiling halogenated hydrocarbon. The amount of solvent is of the order of one to five times the amount of fish tissue present.

The distillation is continued until the temperature rises to or approaching the boiling point of the solvent under the pressure conditions employed. The vapors are condensed, separated from water, and recycled. At this point, the water has been removed substantially completely from the system, and the oil is in solution in the solvent. The solvent-oil solution is drained or filtered from the meal and the oil is recovered from the solvent by distillation in the manner above described. The meal is rinsed once or twice to remove absorbed solvent and oil and is then treated as above described to remove any residual solvent. In this manner stable fish meal and fish oil of high quality is obtained. The temperature can be kept well below the boiling point of water. In this way the "fish water solubles" are retained in the meal. According to the prior art process described above, these were lost or destroyed, or must be recovered separately, and then in impaired condition. By our process the edible meal contains these valuable substances unimpaired and in stable form.

It should be borne in mind that our process differs from processes in which solvent vapors are passed through or over tissue, at a temperature above the boiling point of water.

*Example 3.*—Avocado which contains high percentages of water, fat, and protein may be peeled, the seed removed, sliced and then treated according to the process herein described to remove the oil and water at a temperature below approximately 75° C. when using ethylene dichloride, thereby producing a high quality meal and oil, both of which are substantially free of water. If desired, the distillation can be stopped short of complete water removal in order to leave a few percent of water in the meal. Under some conditions, this may be desirable, depending upon the product sought.

*Example 4.*—Coconut may be decorticated and treated in the manner described herein. It is unnecessary to carry out the pre-coagulation step with coconut. In this manner, a high quality, stable, non-toxic meal is obtained suitable for use in human food or as a source of high quality protein for industrial purposes. Coconut oil may be used for edible purposes or for any of the many uses to which this oil is put, for example in the manufacture of detergents, organic acids, and as a starting material for many organic chemicals.

*Example 5.*—In this run, frozen hog pancreas were finely ground under conditions to prevent thawing. The ground pancreas were added to an extractor and heated, while stirring, to 60° C. in the presence of five parts by weight of ethylene dichloride to one part of tissue.

The extractor was closed and heated, vapors comprising water and solvent, being passed through a vapor line, a condenser and into a receiver. This was continued for about eighty minutes during which the temperature remained at 71° C. Water was withdrawn from the receiver and ethylene dichloride was returned to the still. About 7.5 parts of solvent per part of tissue charged, was recirculated as reflux during this treatment. Near the end of the treatment the temperature rose rapidly to 80.5° C. at which point the heating was stopped. About 0.71 part of water was removed per part of the pancreas charged.

At the end of this treatment, the solvent was withdrawn from the extractor and the solids contained therein were washed with five parts of solvent to one of original pancreas charged at a temperature of 65° C., 30 minutes being allowed for the washing.

The occluded solvent was removed from the solids by heating at a temperature of about 82° C. and a pressure of about 0.8 atmosphere. Open steam at a temperature of about 84.5° C. was then passed through the extractor for 20 minutes under approximately the same pressure conditions. This removed the final traces of solvent from the pancreas solids.

The finished product contained 1.8% moisture; 1.844% of fats by extraction with petroleum ether; and 4.255% of material soluble in ethylene dichloride. These solubilities were determined in a Soxhlet extractor.

The solid material amounted to 14% by weight of the original pancreas charged. The fat amounted to 20% of the original materials charged.

The fat was recovered by distilling off the solvent and treating the fat with steam for a short period after the major portion of the solvent had been removed, all at reduced pressure.

We claim as our invention:

1. A process for simultaneously desiccating and defatting undehydrated biological tissue which comprises the steps of comminuting a water and fat containing tissue, then pre-coagulating it at a temperature above about 60° C. but below 100° C. under conditions to partially coagulate protein sufficient to prevent agglomeration of the comminuted particles, suspending the pre-coagulated tissue in a distillation zone, with a liquid, water-immiscible fat solvent having a boiling point below about 100° C. at the pressure employed, the amount of said liquid solvent being in excess of that required to dissolve substantially all the fat in said tissue but in no event being less than one part of solvent per part of the original tissue, distilling solvent and water vapors from said zone continuously, supplying liquid solvent to the tissue to replace solvent removed by said distillation at least to the extent to maintain the minimum above set forth, continuing the distillation until a desired moisture content of said tissue is reached, discontinuing the distillation before the temperature reaches 100° C. at the pressure employed, separating the liquid mixture of solvent and fat from the dehydrated tissue, rinsing with additional liquid solvent to remove occluded oil, and then evaporating occluded solvent substantially completely from the meal thus produced at a temperature below about 100° C.

2. The process of claim 1 wherein the solvent comprises a halogenated hydrocarbon.

3. The process of claim 1 wherein the solvent comprises ethylene dichloride.

4. The process of claim 1 wherein the tissue is of vegetable origin.

5. The process of claim 1 wherein the tissue is raw liver.

6. The process of claim 1 wherein the tissue is raw pancreas.

7. The process of claim 1 wherein the tissue is raw fish tissue.

8. The process of claim 1 wherein the tissue is of animal origin.

9. The process of claim 1 wherein the tissue is kidney.

10. The process of claim 1 wherein the tissue is glandular.

11. The process of claim 1 wherein the tissue is brain.

12. A process for simultaneously desiccating and defatting biological tissue which comprises comminuting fresh tissue containing water and fat, precoagulating it at a temperature above about 60° C. but below 100° C. under conditions to partially coagulate the protein sufficient to prevent agglomeration of the coagulated particles, suspending the particles in a liquid substantially water-immiscible fat solvent boiling below 50° C. at the pressure employed in the subsequent steps, the amount of said solvent being in excess of that required to dissolve substantially all of the fat in said tissue; maintaining the tissue in suspension in the liquid solvent as substantially discrete particles, distilling solvent and water vapors from said zone at a temperature below about 50° C. and below the boiling point of said solvent while maintaining said excess of liquid solvent in contact with the particles thereby extracting substantially all of the fat from the tissue simultaneously with desiccation, separating the solution of fat and solvent from the desiccated tissue, and evaporating occluded solvent from said desiccated and defatted tissue at a temperature below 100° C.

13. The process of claim 12 wherein the tissue is pancreas.

14. The process of claim 12 wherein the tissue is raw liver.

15. The process of claim 12 wherein the raw tissue is fish offal.

16. The process of claim 12 wherein solvent is a halogenated hydrocarbon.

17. The process of claim 12 wherein the solvent is ethylene dichloride.

18. The process of claim 12 wherein the solvent is trichlorethylene.

19. The process of claim 12 wherein the tissue is of animal origin.

20. The process of claim 12 wherein the tissue is kidney.

21. The process of claim 12 wherein the tissue is glandular.

EVERETT M. WORSHAM.
EZRA LEVIN.

REFERENCES CITED

The following references are of record in the file of this patent:

UNITED STATES PATENTS

| Number | Name | Date |
|---|---|---|
| 125,248 | Adamson et al. | Apr. 2, 1872 |
| 1,005,539 | Grothass et al. | Oct. 10, 1911 |
| 1,934,677 | Ash | Nov. 14, 1933 |
| 2,358,869 | Maurer et al. | Sept. 26, 1944 |